April 7, 1953  N. RANSOHOFF  2,633,855
CONTINUOUS CONVEYING AND HOISTING DEVICE
Filed Dec. 9, 1946  7 Sheets-Sheet 1

INVENTOR.
Nathan Ransohoff
BY
Wood, Arey, Herron & Evans
ATTORNEYS.

April 7, 1953  N. RANSOHOFF  2,633,855
CONTINUOUS CONVEYING AND HOISTING DEVICE
Filed Dec. 9, 1946  7 Sheets-Sheet 2

INVENTOR.
Nathan Ransohoff
BY
Wood, Arey, Herron & Evans
ATTORNEYS.

April 7, 1953 N. RANSOHOFF 2,633,855
CONTINUOUS CONVEYING AND HOISTING DEVICE
Filed Dec. 9, 1946 7 Sheets-Sheet 4

Inventor
Nathan Ransohoff
By Wood, Arey, Herron & Evans
Attorneys

Patented Apr. 7, 1953

2,633,855

UNITED STATES PATENT OFFICE 2,633,855

CONTINUOUS CONVEYING AND HOISTING DEVICE

Nathan Ransohoff, Cincinnati, Ohio, assignor to N. Ransohoff, Inc., Elmwood, Ohio, a corporation of Ohio Application December 9, 1946, Serial No. 715,063

34 Claims. (Cl. 134—58)

This invention relates to a machine for treating metal parts with chemical solutions in a progressive, automatic and continuous manner. More particularly, the invention comprehends a treating apparatus wherein metal parts in baskets progressively are immersed in chemical solutions such as detergents, pickling or surface treating reagents, after which the parts are rinsed and if desirable, dried before discharge.

The principal objective has been to provide a machine of substantial capacity capable of treating work in this manner in predetermined sequences of operation and for predetermined intervals of time such that when the treating solutions are of uniform nature the work will receive uniform treatment. A further objective has been to provide a continuous and automatic treating machine in which the duration of the various treatment periods may be altered or adjusted according to the nature of the chemical solutions or the nature of the work pieces.

Machines of this type are adapted for a wide variety of industrial processing purposes. For purposes of illustration, but not by way of limitation, the apparatus is disclosed in the form of a machine suitable for exposing pieces of sheet steel to a thorough and uniform cleansing action in order that the pieces will be conditioned and prepared to receive a coating of vitreous enamel; processing of this nature requires a considerable degree of perfection, inasmuch as any defective treatment will become apparent after the porcelain enamel composition has been applied and fired.

The invention contemplates a machine comprising, essentially, a conveyor, a plurality of baskets which may be transferred from station to station by the conveyor, a series of tanks for holding respective treating reagents or rinsing stations, and hoist bars which are cooperable with the baskets for respectively lowering and raising the baskets vertically toward and from the tanks whereby the work sequentially is immersed in each treating solution for a period of time, then removed therefrom, and subsequently advanced to the next treatment tank.

In the preferred organization, the conveyors are in the form of continuous loop-shaped units comprising parallel runs of substantial length which are driven by suitable electric drive. The hoist bars are disposed in alignment with and beneath the respective conveyor runs and the hoist bars are moved preferably by a second electric power unit. The power units for the conveyor and the hoist bars are synchronized in respect to one another such that the desired sequence of movements of work baskets is obtained. The baskets preferably are suspended as by means of cables and mechanical connections incorporated in the respective carriages cooperate with the hoist bars to raise or lower the baskets relative to the tanks according to the longitudinal reciprocating motions of the hoist bars relative to the conveyor units. In this manner, each work basket moves intermittently; the baskets horizontally are transferred collectively from station to station above the successive tanks and the baskets vertically are transferred to and from the tanks for timed sequential treatments of the work therein.

The apparatus also involves a simplified control system for regulating the inter-dependent motions of the conveyor chain and hoisting units.

From this description of the principles upon which the invention is predicated, and from the following detailed description of the drawings which illustrate a typical embodiment of the invention, those skilled in the art will comprehend the advance modifications to which the invention is susceptible.

In the drawings:

Figure 37 is a side view further illustrating the modified stabilizing mechanism.

Figures 1, 32, 33:
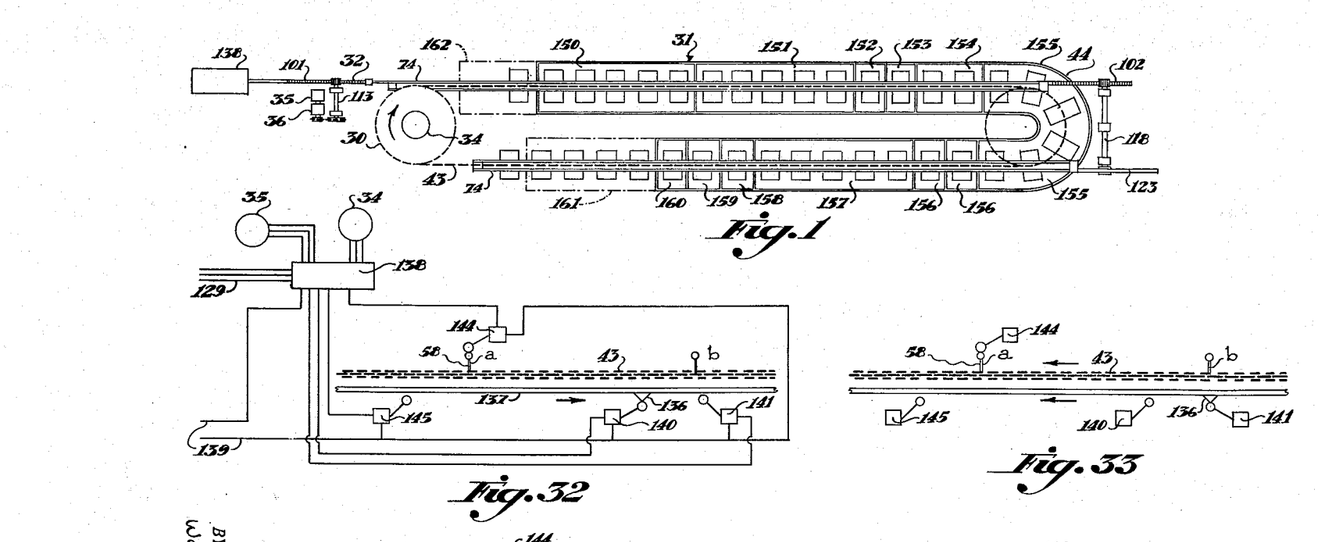
Figure 1 is a general top plan view illustrating the treating apparatus diagrammatically.
Figures 32 to 35, inclusive, illustrate diagrammatically the control apparatus for the machine through a cycle of operation, Figure 32 showing the initial starting position of the apparatus and Figure 35 showing the final position.

Referring specifically to Figure 1 of the drawings, the apparatus in general constitutes a conveyor system indicated at 30, a series of chemical treatment tanks 31 and a hoist mechanism 32. The conveyor is driven by an electric motor 34 and the hoist mechanism by the motor 35. Each motor includes a suitable reduction gear unit 36 of conventional design for the purpose of establishing a proper speed reduction appropriate to the operation of the respective conveyor and hoist mechanism.

Figures 19, 22:
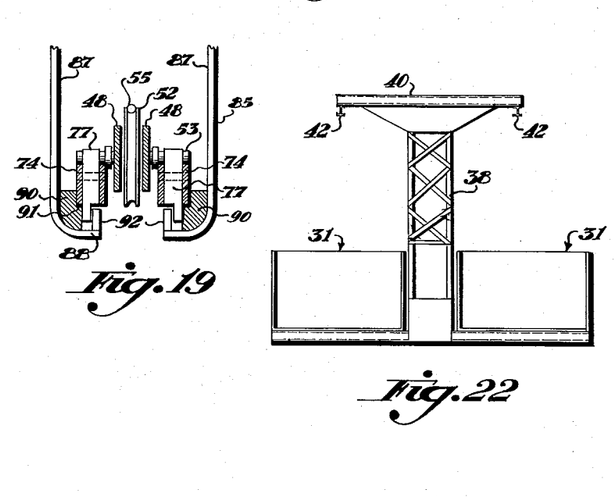
Figure 19 is a sectional view taken on line 19—19 Figure 17.
Figure 22 is an end view illustrating generally the relationship of the conveyor with respect to the treating tanks.

As shown in Figure 22, the conveyor system is carried upon a superstructure 38 fabricated of structural steel members and rising vertically between the treatment tanks 31. The upper end of the superstructure includes cross beams 40 supporting a continuous loop-shaped I beam 42. I beam 42 forms a continuous conveyor track consisting of forward and return runs connected at opposite ends by return bends. This track serves a longitudinal arrangement of treatment tanks arranged in end to end relationship and forming a continuous line for each lineal conveyor run. These tanks are joined at the forward end of the machine by a tank 44 in the form of a return bend corresponding to the forward return bend of the conveyor track. As shown in Figure 22, the conveyor track 42 is approximately centered above the treatment tanks.

The conveyor is of the mono-rail trolley type employing a single conveyor chain 43 suspended from the track. Of somewhat standardized construction, the conveyor employs a series of chain hangers or trolleys 44 and, work support carriages 45. The hangers are in the form of duplex brackets connected to the chain and having rollers 46 journalled in their upper ends, tracking upon the lower flange of I beam 42 on opposite sides thereof. The carriages 45 are supported by hangers of like construction, one at each end thereof and likewise having rollers 46 tracked upon the I beam.

It is to be noted that each carriage 45 is connected to hangers 44 by means of spaced plates 47, depending downwardly from the hangers. These spaced plates are connected to the opposite ends of a pair of spaced horizontal spacer plates 48 which form the body of the carriage.

Figures 2, 3, 4, 5, 6, 7:
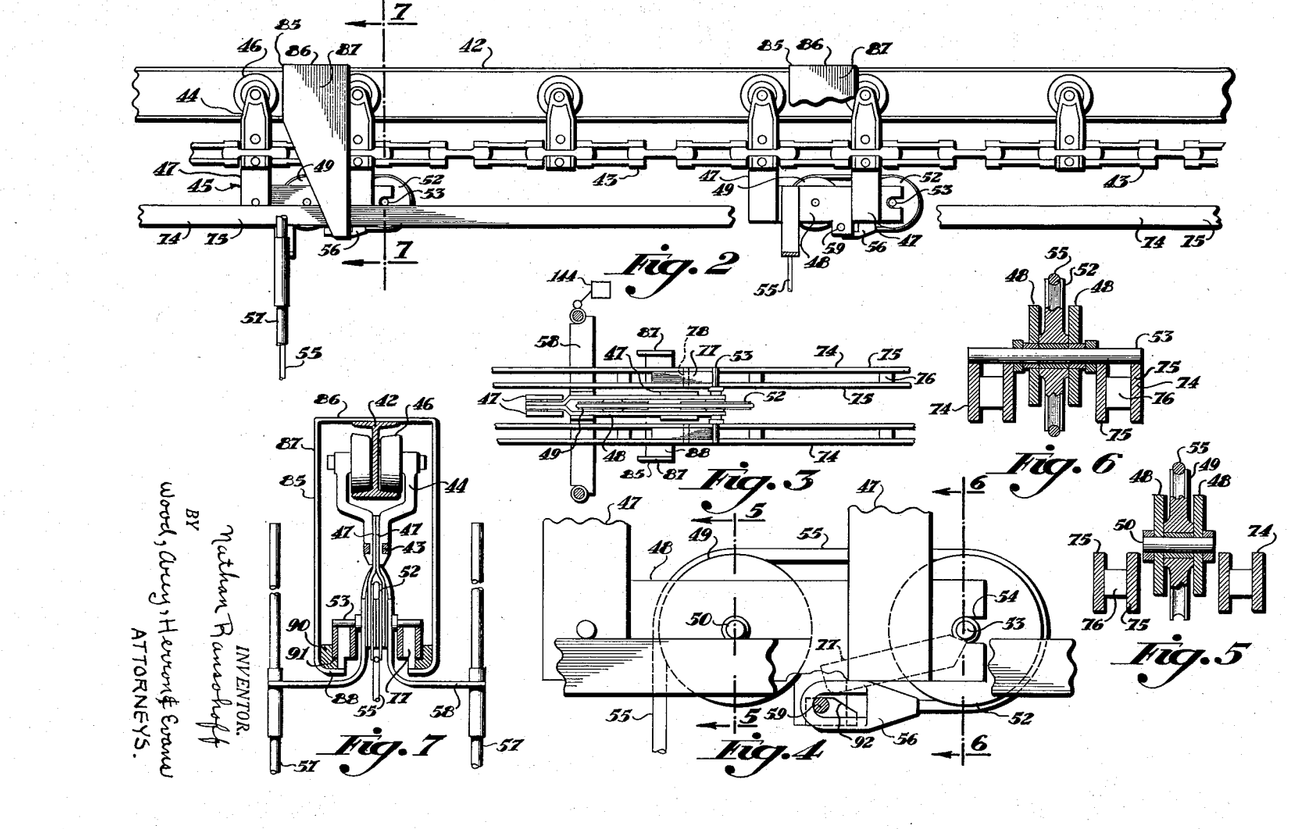
Figure 2 is an enlarged side elevation illustrating the conveyor, carriages, and hoisting bars in cooperating relationship.
Figure 3 is a top plan view further illustrating the relationship existing between a conveyor carriage and hoist bars.
Figure 4 is an enlarged fragmentary side elevation detailing the construction of the lower portion of one of the conveyor carriages and the basket supporting pulley tackle.
Figure 5 is a sectional view taken on line 5—5 of Figure 4 detailing the primary basket support pulley which is journalled in the carriage.
Figure 6 is a sectional view taken on line 6—6 of Figure 4 detailing the construction of the secondary translatable or basket hoisting pulley of the carriage.
Figure 7 is a general cross sectional view of the conveyor and hoist bars taken on line 7—7 of Figure 2.
Figure 20:
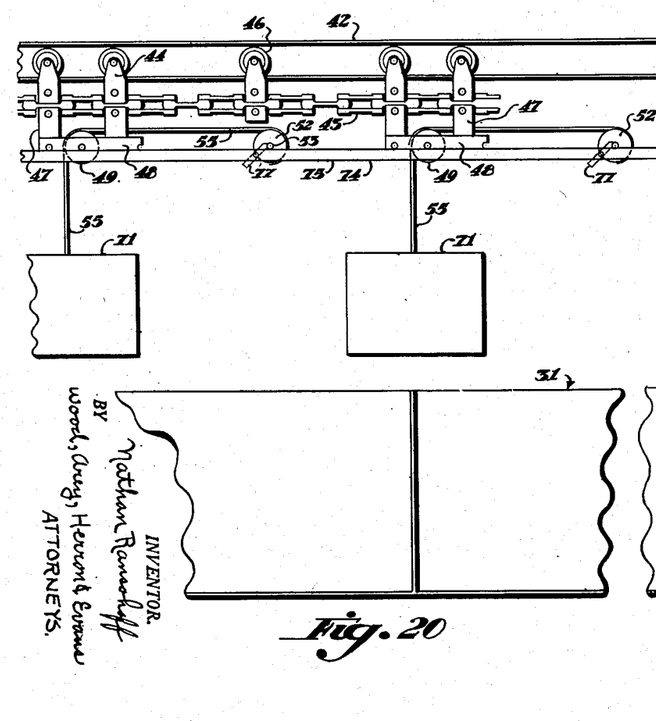
Figure 20 is a view illustrating somewhat diagrammatically the basket being conveyed in elevated position from one tank to the next.
Figure 21:
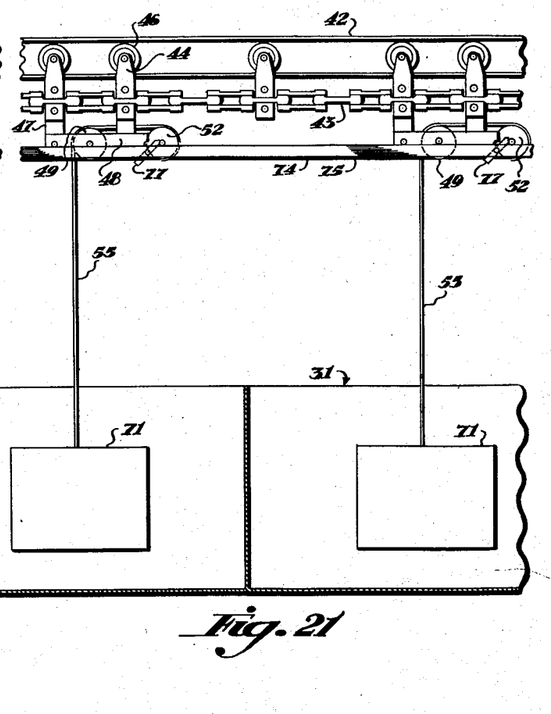
Figure 21 is a view similar to Figure 20 showing the baskets in lowered position in the treatment tanks.

Referring now to Figure 4 a primary pulley or sheave 49, journalled upon bearing shaft 50, is disposed between the plates 48 toward the forward or leading edge thereof. At the rearward edge of plates 48, is carried a secondary translatable pulley 52 carried upon bearing shaft 53 which shaft is engaged in an open slot 54 formed in the rearward edge of the carriage plates 48. The cross shaft 53 is therefore free to be translated rearwardly, that is in a direction opposite to the direction of conveyor travel. When the secondary pulley 52 is engaged in the slot 54 as shown in Figure 4 the baskets or trays are in their lowered position with respect to the tanks as shown in Figure 21, and when the pulley is thrust rearwardly as shown in Figure 20 the baskets are elevated.

For this purpose each basket is suspended by a flexible cable 55 secured by means of an eye 56 engaged upon a pin 59 mounted in the carriage side plates 48. This cable passes around secondary pulley 52 and over primary pulley 49 and has its lower end attached to the support frame of a work basket or rack. It will be noted that the tackle arrangement of pulleys 49 and 52 causes the basket to be elevated approximately twice the distance of the horizontal translation of pulley 52.

A pair of slidable guide rods 57 is disposed vertically on opposite sides of the conveyor, in spaced relationship and in parallelism with the depending cable 55. These guide rods are slidably carried in sleeves mounted on angle brackets 58, which brackets are secured to the lower portion of the conveyor trolleys or hangers so as to carry the guide rods along with the trolleys as they move through the machine. The rods guide the baskets in a straight line in their vertical motions, stabilize the baskets and prevent a pendulum effect as the conveyor starts and stops.

As shown in Figures 23 to 26, the lower ends of the guide rods 57 are secured to a U-shaped bracket 60 having a cross member 61 at the center of which is secured a lug 62. Lug 62 is adapted to receive a clevis 63 secured on the lower end of cable 55, which clevis is attached to the lug by a clevis pin 64. Hooks 65 are formed at the lower ends of the vertical limbs 66 of the U-shaped bracket. These hooks engage a cross shaft 67 secured by angle brackets 68 to a cross member 70.

Work baskets or receptacles 71 are suspended from the cross members by means of straps 72 looped over the opposite ends of the cross member 70, cradling and supporting the work baskets. By virtue of the hook-on mounting of the baskets, they may be removed bodily from the conveyor at the loading and unloading zones, without interrupting the operation of the machine.

Figures 23, 24, 25, 26, 27, 36:
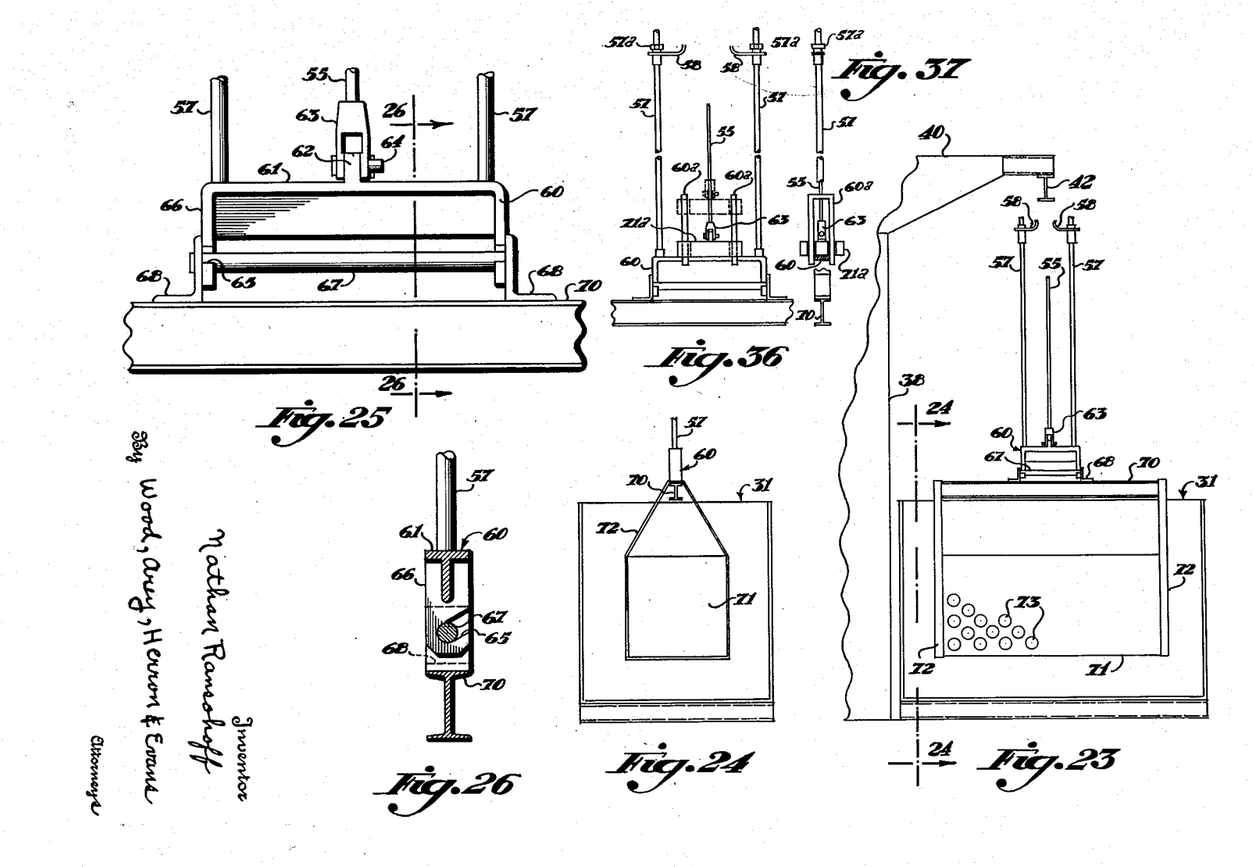
Figure 23 is a fragmentary end view generally illustrating the mechanism for guiding and stabilizing the work baskets or racks in the vertical movements of the baskets relative to the treatment tanks.
Figure 24 is a fragmentary sectional view taken on line 24—24 Figure 23 further illustrating the manner of suspending the baskets relative to the tanks.
Figure 25 is an enlarged end view detailing the basket support frame and stabilizing means shown in Figure 23.
Figure 26 is a sectional view taken on line 26—26 Figure 25 showing the hook-on arrangement for connecting the baskets to the support frame.
Figures 27 to 31, inclusive, illustrate diagrammatically the several motions of the conveyor chain and hoist apparatus in conveying, lowering and elevating a basket relative to the treatment tanks during a cycle of operation.
Figure 36 is a view similar to Figure 23 showing a somewhat modified arrangement for guiding and stabilizing the work receptacles.
Figure 27:
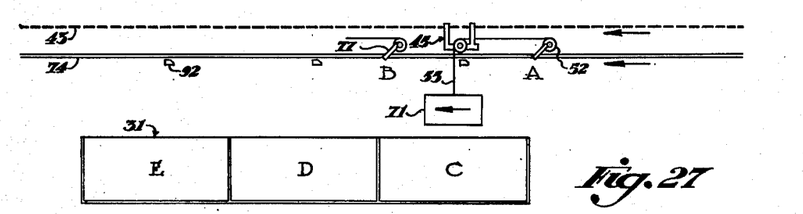

In the modified arrangement shown in Figures 36 and 37, the work basket in its final lowered position, is suspended by the guide rods 57—57 rather than by the cable 55. For this purpose, the guide rods are provided each with a stop collar 57a secured to the upper ends of the respective rods. These collars engage the upper ends of the sleeves carried by the angle brackets 58 when the baskets reach their lower limit of travel and thus relieve the cable 55 of the load.

Engagement of the stop collars 57a by the guide sleeves to support the load occurs slightly in advance of final engagement of the secondary pulley cross shaft 53 in its slot 54, therefore, a counterweight 71a is provided to take up the slack in cable 55. This counterweight is interposed between the lower end of the cable 55 and the U-shaped bracket 60, and is guided for vertical movement in a guide frame 60a secured to the U-shaped bracket. The counterweight keeps cable 55 taut after the basket is completely lowered and translates by gravity the secondary pulley cross shaft 53 to its final position lodged in the slot 54, after disengagement of the latch dogs 77 as hereinafter disclosed.

The work baskets or racks are of rectangular configuration as viewed in plan and are carried through the machine in a position crosswise to the direction of travel. These baskets are constructed preferably of stainless steel sheets, perforated as at 73 to provide a sieve effect as they are dipped into and removed from the treating tanks.

Figure 18:
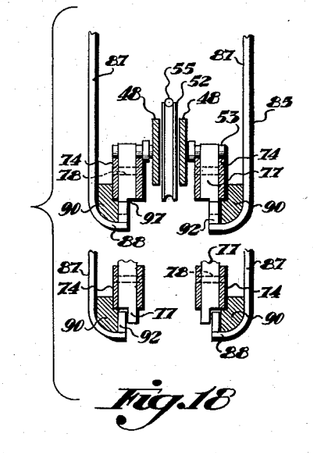
Figure 18 is a sectional view on line 18—18 Figure 15.

Each hoist bar 74 is duplex, each being made up of two sets of spaced parallel rails 75 joined together by spacers 76 and arranged in pairs straddling carriages 45. Each set includes a series of retractable latches or dogs 77 disposed in aligned pairs, each dog being carried between sets of rails 75, pivotally mounted by means of pins 78 engaged in the rails. A stop 79 is located beneath each dog to hold the dog in actuating position, the lower end 80 of the dog or latch being extended downwardly a sufficient distance to overbalance its upper end, to swing the dog to an angular operating position. The upper end of the dog projects beyond the top surface of the hoist bars in a position to engage in pairs, the respective opposite protruding ends of the shaft 53 of secondary pulley 52 as shown in Figure 18. One pair of dogs is provided for each treatment tank for purposes hereinafter disclosed.

Since the apparatus in the present instance is of considerable length, a series of hangers 85 is provided at spaced intervals to sustain the hoist bars. As shown in Figures 2 and 7, each hanger comprises a U-shaped bracket having a connecting section 86 resting upon and secured to the upper flange of the mono-rail I beam 42, and having vertical limbs 87 extending downwardly, the lower ends of limbs 87 having horizontally inturned flanges 88. A pair of bearing blocks 90 is secured to the respective inturned flanges 88, each block including a bearing face 91 which serves as a support for the hoist bar, permits the bar to slide in a lineal direction, and retains the bar in position laterally.

Figure 15:
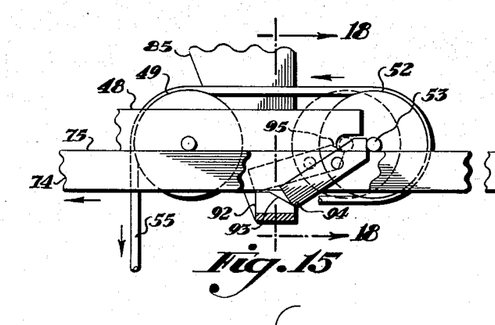
Figures 15, 16 and 17 illustrate diagrammatically the operation of the hoist bar relative to the pulley tackle in raising and lowering a basket with respect to a tank.
Figure 16:
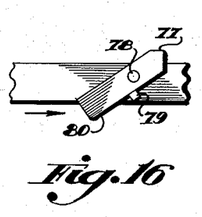

Each hanger further includes a pair of cam blocks or skids 92, each having an inclined face 93 adapted to engage and trip the lower end 81 of selected pairs of dogs 77. Cams 92 disengage the ends of the dogs from the cross shaft 53 of secondary pulley 52 slightly before the end of the lowering cycle. As shown in Figure 15, the lower corner 94 of the dog slides up the inclined surface 93 causing the dog to pivot upon its pin 78 and causing the upper end of the dog to retract below the upper surface of the hoist bars, thus freeing the cross shaft 53. At this time the cross shaft 53 is about to engage its slot 54 while the upper inclined surface 95 of the dog disposed beneath the shaft as shown in dotted lines on Figure 15. From this position, the dog is free to move forwardly as carried by the hoist bar, to engage the cross shaft 53 of a succeeding elevator or secondary pulley 52.

When the cross shaft 53 is released by the dog, the weight of the work basket causes the cross shaft to slide into the slot 54. In the instance of the modified arrangement shown in Figures 36 and 37, the weight of the basket is sustained by the stop collars at the time the latch dogs disengage. However, the counterweight 71a provides an additional cable motion to carry into the slot the cross shaft 53. This reduces the shock due to the drop of the basket, since the counterweight is considerably lighter than the loaded work basket.

In order to provide the hoist bar and dog travel necessary to perform the raising, lowering and horizontal movements for transporting the baskets from tank to tank, each dog must pass one set of cam blocks without being tripped. In other words, a set of dogs is arranged to pass one hanger without tripping and to be tripped at the next hanger encountered. This occurs at the completion of the horizontal transfer of the baskets from one station to the next.

Each hanger constitutes a transfer point, each being located above one of the several treatment tanks so as to transfer vertical control of the basket to a new set of control dogs at the beginning of each new cycle. This operation will be more completely described in another portion of this specification with reference to a general description of the cycle of operation.

Figure 28:
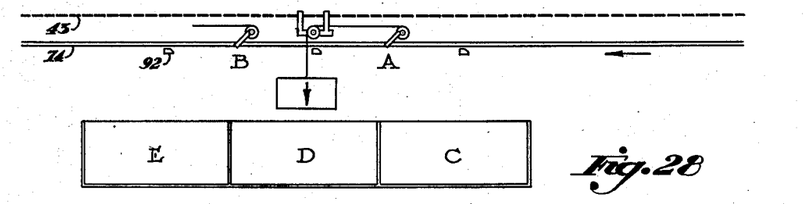
Figure 29:
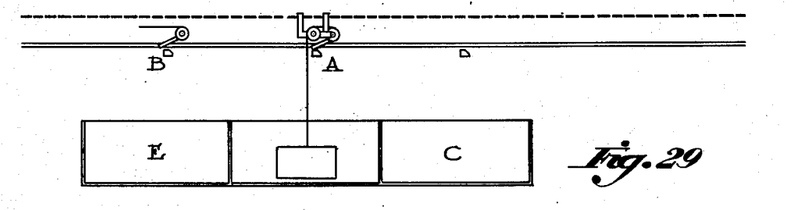

In order to provide treatment periods which may be varied to suit the time interval requirements of the several treating stations, the several tanks of the machine vary in length, ranging from a single cycle to a multiple cycle treatment period. In the instance of the single cycle tanks, the tanks are dimensioned to receive a single basket.

Where several single treatment tanks are disposed in adjoining relationship, with a transfer hanger and cam above each tank, the lowering motion of the hoist bar, added to the horizontal transfer motion of the bar, causes a given set of hoist dogs to overrun the distance between the respective transfer stations. By way of example, a given hoist dog, as shown in Figures 27 to 29, travels from the position shown in Figure 27 past the transfer station above tank "C," to the center of tank "D." In other words, the dog travels a distance approximately equal to one and one-half times the length of the tanks illustrated. Therefore, it is necessary for the dogs to pass or skip one transfer point to be tripped at the next succeeding transfer point.

Figure 17:
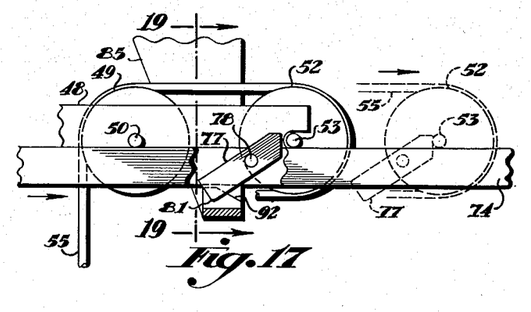

Referring now to Figures 18 and 19, it will be noted that the lower ends of the trip dogs are laterally notched as at 97, each succeeding set being notched on an opposite side. These notches are alternately to the inside and outside of the dogs. It will be further noted that the cam blocks 92 are spaced laterally a greater distance apart in Figure 18 than in Figure 19. Therefore, a given set of dogs, as shown in Figure 15, is tripped by the cam block at that hanger, but the spacing of the blocks at the next succeeding hanger disposes them in alignment with the notches 97 of the same dogs, thereby permitting the dogs to pass without being tripped. Figure 18 illustrates the disposition of the cam blocks relative to the tripping station shown in Figure 15, and Figure 19 illustrates the disposition of the blocks at the non-tripping station shown in Figure 17. It will be observed that the set of dogs alternate to the set illustrated in operation, being notched to the inside, will pass the cam blocks of Figures 15 and 18 and will trip upon encountering the cam blocks shown at Figures 17 and 19. This set of dogs is illustrated diagrammatically beneath Figure 18. It will be apparent that this set of dogs will clear the cam blocks in Figure 18 and trip on the cam blocks shown in Figure 19.

The reciprocatory motions of the hoist bar relative to the conveyor causes the dogs collectively to engage or disengage the work baskets to permit the baskets to be simultaneously lifted from the tanks, transferred to a position above succeeding tanks, and lowered therein. The conveyor moves intermittently, stopping when the baskets reach a point or station above the tanks, which station corresponds to the cam block transfer stations above-described. The hoist bar motions are timed to cooperate with the conveyor in performing this function as hereinafter disclosed.

Figures 8, 9, 10, 11, 13:
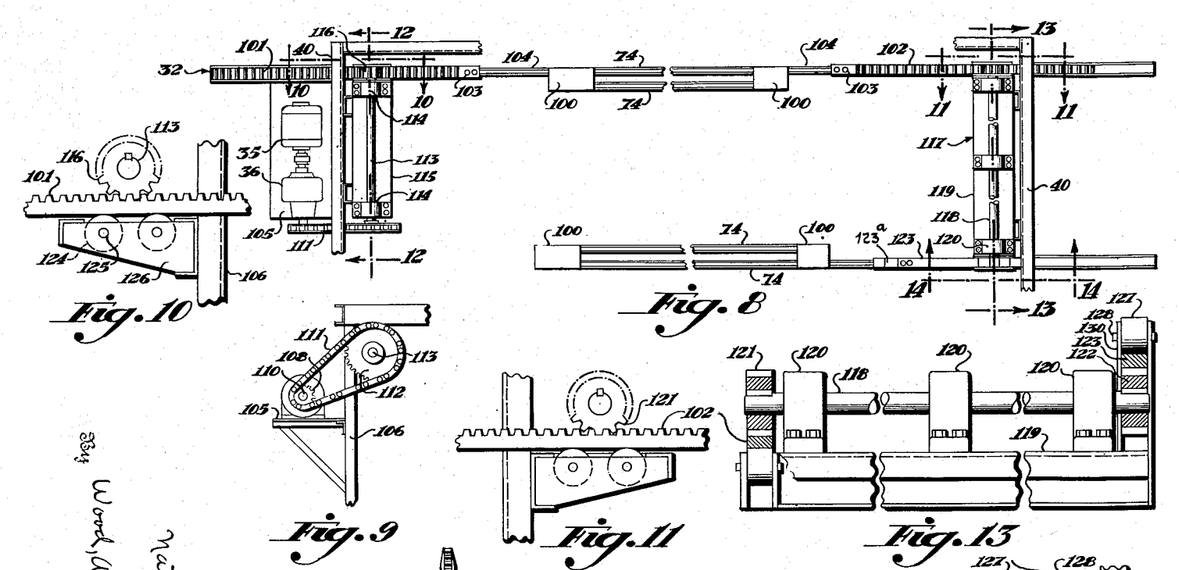
Figure 8 is a fragmentary top plan view illustrating generally the actuating mechanism for the respective hoist bars.
Figure 9 is a fragmentary side elevation projected from Figure 8, showing the driving connection of the hoist motor to the hoist bars.
Figure 10 is a fragmentary sectional view taken on line 10—10 of Figure 8 further detailing the driving connection of the motor to the hoist bar rack.
Figure 11 is a fragmentary view taken on line 11—11 Figure 8 similar to Figure 10 illustrating the transfer driving connection between the racks at the forward end of the machine.
Figure 13 is a transverse sectional view similar to Figure 12 taken at the forward end of the machine on line 13—13 Figure 8 further illustrating the cross connection or transfer drive at the forward end of the machine.
Figure 12:
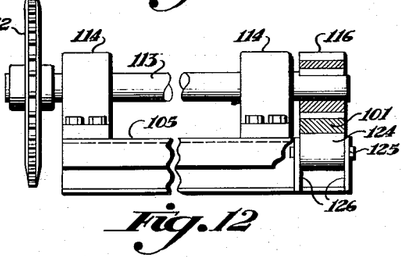
Figure 12 is a transverse sectional view taken on line 12—12 Figure 8, further detailing the drive mechanism for the racks.

Described in detail the hoisting mechanism 32 comprises the previously described pair of hoist bars 74, one for each run of the conveyor, disposed beneath and in alignment with each respective run of the track or I beam 42, as shown in Figures 7 and 8. At the opposite end of each hoist bar is secured a flat plate 100, the plate preferably being welded to the bars. The hoist bar for the forward conveyor run includes at respective opposite ends, a rack 101 and 102, rack 101 being at the rearward end, and rack 102 at the forward end of the bar. These racks are secured by means of bolts or pins 103 to the extended ends 104 of the rails 75, and the plates 100 firmly secure the spaced sets of rails together in pairs for unitary motion.

Both the forward and return run of hoist bars are powered by means of motor 35 which is mounted upon a mounting plate 105 secured to the frame 106 of the machine as shown in Figure 9. Power is transmitted from the motor through gear reduction unit 36, to sprocket 108 keyed to shaft 110 of the reduction unit. A sprocket chain 111 connects sprocket 108 to sprocket 112 which is keyed upon a shaft 113 extending at right angles to the rack 101. Shaft 113 is journalled in bearings 114—114 mounted upon a plate 115 as part of the frame 106. The opposite end of shaft 113 carries a rack pinion 116 in mesh with rack 101. Forward and reverse rotation of motor 35 thus is transmitted to shaft 113 to cause forward and reverse lineal movements of the rack and hoist bars.

The movements of the forward hoist bar are transmitted to the return hoist bar by means of a transfer mechanism generally indicated at 117 at the forward end of the machine. This mechanism consists of a cross shaft 118 suitably mounted in bearings 120, and similar to bearings 114 previously mentioned, these bearings are mounted on a similar mounting plate 119 secured to the machine frame. A pair of rack pinions is mounted upon opposite ends of shaft 118, the pinion 121 meshing with rack 102 of the forward run of the hoist bar and pinion 122 meshing with a rack 123 secured to the return run hoist bar. It will be noted that pinion 121 is disposed above rack 102 while pinion 122 for the return section of the hoist bar is disposed beneath the rack section 123. This provides a reversal of direction between respective forward and return runs of the hoist bar. In other words, when the forward run hoist bar moves to the right, the return run moves to the left, and vice versa. Rack section 123 is secured to the return hoist bar by means of a bracket 123a indicated in Figure 8, to elevate the rack section 123 above the hoist bar lever and permit it to mesh over pinion 122.

Figure 14:
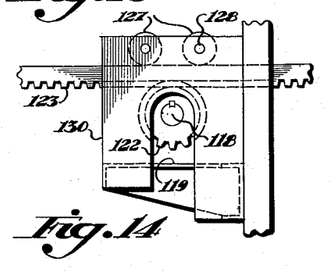
Figure 14 is a side elevation as indicated at 14—14 Figure 8, further detailing the transfer drive connection to the rack.

As shown in Figure 10, the rack bar 101 is supported and maintained properly in mesh with pinion 116 by means of a pair of rollers 124 journalled on shafts 125, which shafts are carried by brackets 126 disposed on opposite sides of the rollers. The rack 102 at the forward end of the hoist bar in a similar manner is supported by a roller mechanism of identical construction. In the case of the return run rack 123 a pair of rollers 127 is provided, which in this instance is disposed above the rack bar as shown in Figure 14. The cross shafts 128 upon which the rollers 127 are journalled, are mounted between a pair of side plates 130 forming a mounting bracket for the rollers and secured to the frame of the machine preferably by welding.

It will be noted that both the forward and return hoist bars perform their elevating function, with respect to the baskets, on the draw stroke. In other words, the bars reciprocate right and left and the forward run hoist bar engages and elevates its baskets as it is drawn to the left by the power unit, and the return hoist bar engages and elevates its baskets simultaneously as it is being drawn to the right by the transfer mechanism 117. Thus, during their working stroke, the bars are in tension, and during their lowering stroke the weight of the work baskets maintains them in tension, the power unit serving primarily to control the rate of descent.

*Control system of hoist bars and conveyor*

The correlated movements of the hoist bar and conveyor are controlled from a centralized electrical control unit generally indicated at 138 on Figure 1. This unit incorporates a timer which controls fundamentally the timing cycle of the apparatus and includes also a switch control bar which is connected directly to the forward run hoist bar 75 for longitudinal movement therewith. The timer initiates the start of each cycle by energizing hoist motor 35, causing the hoist bar to move in basket elevating direction. Switch control bar being connected to the hoist bar moves with the bar to interconnect the conveyor movements with the hoist bar movements. This is accomplished by means of limit switches associated with the control bar and with the conveyor chain itself, these switches being in circuit with suitable relay switches and control circuits to interconnect and regulate the conveyor and hoist motors. These motors are of the constant speed type so that the conveyor and hoist bars move at a uniform rate.

The several movements of the hoist bar and conveyor relative to the control system are illustrated diagrammatically in Figures 32 to 35. Although the specific control circuit of the hoist bars and conveyor motors is not an essential feature of the present invention, a generalized diagram of the circuit is shown in order to facilitate an understanding of the operation of the machine.

It will be noted that the directions of travel of the control bar and chain shown in the control circuit correspond with those in the mechanical diagrams shown in Figures 27 to 31. In other words, the control circuit is shown as incorporated in the return run hoist bar, thus coordinating the control circuit with the return conveyor run as illustrated in the mechanical diagrams to clarify a disclosure of the operations. In practice, however, it has been found advisable to interconnect the control circuit with the forward run hoist bar as indicated in Figure 1.

The control circuit incorporates a series of limit switches having rollers arranged to be actuated by a cam 136 secured on a control bar 137. The circuit includes a timer (not shown) which controls the period in which the parts to be treated are immersed, and which in the present instance by way of example, is timed to provide treatments of one minute or multiples of one minute. It will be apparent that the system can be arranged for basic time cycles of greater or lesser intervals.

It will be observed that the conveyor motor operates in one direction only, while the hoist motor is reversible, so as to provide forward and reverse movements to lower and raise the baskets relative to the tanks. As shown, the hoists and conveyor motors are energized by the three phase power lines indicated at 129. The power supply from lines 129 to motors 34 and 35 is regulated by the control circuit 138 which incorporates the aforesaid timing device and relay apparatus necessary to control the system.

The several limit switches are connected to the control circuit by means of a low voltage limit switch or control circuit 139. One side of this circuit runs directly to the motor control circuit 138 while the opposite side runs to the limit switches, passes through the switches to the control circuit 138. Upon actuation of the limit switches by the cam 136, the control circuit causes operation of the respective motors 34 and 35.

Figure 30:
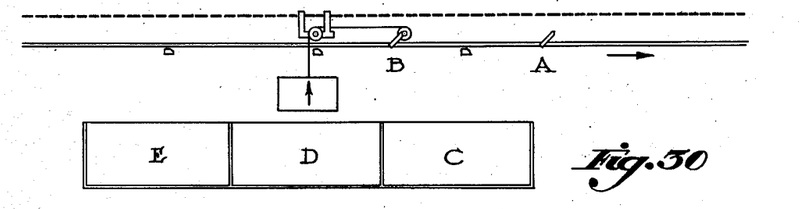

Referring again to Figure 32, the system is shown at the beginning of a cycle with the basket lowered in the tank corresponding to the position shown in Figure 29 and with limit switch 140 actuated by cam 136 to hold both motors stationary for a treatment period as determined by the timer. When the timer reaches the end of the treatment cycle, hoist motor 35 will be energized to cause the hoist bar to move to the right as indicated in Figure 32 elevating the basket as shown in Figure 30. This movement will continue until the cam 136 actuates the right hand hoist motor limit switch 141 as shown in Figure 33.

The limit switch 144, which controls conveyor travel, is located so as to be actuated directly by the conveyor by engagement with the guide sleeves carried by the brackets 57, as shown in Figure 3. Each time the switch is tripped by one of the sleeves in passing, the conveyor motor circuit is de-energized and the conveyor stopped. The conveyor remains stationary until the circuit is re-energized by the control circuit. This arrangement provides a positive stopping point for the conveyor with respect to the treatment stations so as to insure that each work basket is in proper registry with the tanks before being lowered.

Figure 31:
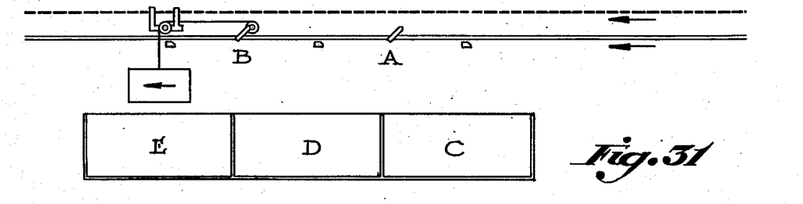
Figure 34:
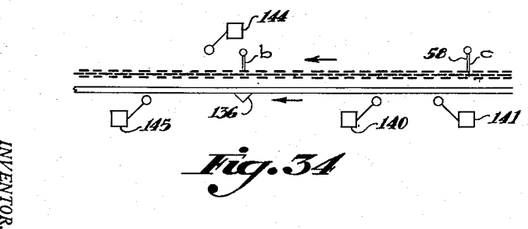

When switch 141 is actuated, both motors are energized, the hoist motor to reverse itself and cause the bar to travel in a left hand direction as indicated, and the chain to move at the same rate also in the left hand direction corresponding to diagram Figure 31. Motion in the left hand direction continues until the next conveyor guide sleeve encounters limit switch 144 which again de-energizes and stops conveyor motor 34. The bar however, continues in its left hand movement. The result of this operation is apparent in Figures 28 and 29; the left hand motion of hoist bar causing the basket to be lowered into the next succeeding tank and the dog 77 disengaged.

Figure 35:
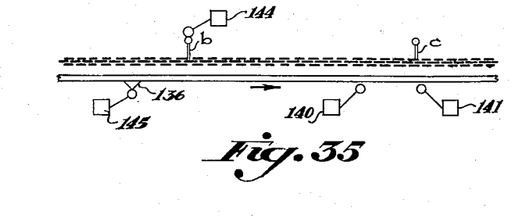

When the hoist bar reaches its final limit of travel as shown in Figure 35, cam 136 trips limit switch 145, causing hoist bar motor to reverse its direction to start the hoist bar to the right. The hoist bar motor will continue to operate in this direction until the cam 136 again encounters limit switch 140, to de-energize the hoist motor circuit and bring the hoist bar to a stop at its starting position as shown in Figure 32. The basket remains immersed in the tank and a succeeding dog is now positioned to elevate it when the cycle is again initiated by the timer.

It is pointed out that both the motors 34 and 35 are equipped with electric brakes, preferably built into the motors in order to stop them immediately when the circuit is de-energized. The hoist motor is arranged to stop and reverse when the reversing switches 141 and 145 are tripped without overrunning to insure that the basket is properly raised and lowered in the proper timed relationship with the movement of the conveyor. It is further noted that both motors are of the constant speed type, in the present instance running at 1800 R. P. M. each, and properly reduced through the gear reduction units 36 associated therewith, to provide the desired rate of linear conveyor and hoist bar travel.

*Operation of the basket raising and lowering mechanism*

A general understanding of the function of raising and lowering the basket may be had upon reference to Figures 20 and 21. However, since the conveyor chain runs intermittently in a clockwise direction while the hoist bar operates in alternate directions, the relationship of a given conveyor carriage and basket changes constantly with respect to the hoisting dogs carried by the hoist bar.

Figures 27 to 31, showing the several movements of a basket in its passage through the machine, is representative of a typical portion of the machine and illustrates the motions of a single basket or tray with reference to the one cycle treatment tanks indicated. In order to simplify the illustration, the apparatus discloses a single basket or tray, although it will be understood that all of the baskets traveling through the machine simultaneously follow the same pattern of movement illustrated.

As shown in Figure 27, the basket has completed its treatment in tank "C," has been elevated, and is in position to be advanced horizontally to a position above tank "D" for the next treatment. For this purpose, the hoist bar and conveyor chain move together at a uniform rate until the basket reaches the position above tank "D" as shown in Figure 28. At this point, the conveyor chain stops and the hoist bar continues its horizontal movement to the left causing the basket to be lowered into tank "D" as shown in Figure 29.

It will be noted that dog "A" acted upon the basket in the first three motions shown in Figures 27, 28 and 29. Upon lowering the basket into tank "D," the secondary pulley 52 is returned to its carriage, its bearing shaft 53 being seated in the slot 54 as shown in Figures 4 and 15. The function of dog "A" relative to the basket is now completed and it is tripped by cam block 92 over tank "D" to disengage the bearing shaft. Control of the basket is now transferred from dog "A" to dog "B" and the cycle is complete.

At the end of the treatment period in tank "D," the bearing shaft again is engaged, this time by dog "B," to elevate the basket as shown in Figure 30. This is the first operation of a new cycle and the motion of the hoist bar to the right in elevating the basket, carries dog "A" back to its initial position, which corresponds to the position shown in Figure 27. Dog "B" now performs the same function with reference to tank "E" as dog "A" performed with reference to tank "D."

Referring again to Figures 27 and 28, it will be noted that dog "A" is not tripped in passing cam block over tank "C," but that dog "A" is tripped when it encounters the cam block over tank "D" at its limit of rearward travel. This is accomplished by the laterally offset relationship of alternate sets of cam blocks in combination with the alternately notched dogs as described with reference to Figures 18 and 19.

A brief summary of the above described cycle of operation is here given. The conveyor chain moves intermittently in the same direction, each movement advancing the baskets from the center of one tank to the center of the next. The hoist bar moves with the conveyor, but when the conveyor stops with the baskets poised above the tanks, the hoist bar continues to move for a sufficient distance in the same direction to lower the baskets into the tanks. This distance is approximately one-half the vertical travel of the baskets due to the reducing function of the carriage pulley tackle previously noted with reference to Figure 4. The dogs then disengage and after a time interval the bar moves in the opposite direction back to the starting point to control the next series of baskets. Since the bar must travel a greater distance than the center to center distance of the short tanks (due to the raising and lowering of the baskets), each dog overruns one cam during its movement with the conveyor and is tripped when it encounters a second cam. In other words, each dog is keyed to pass clear of the first cam it encounters, and trip on the second cam. Thus, the reciprocating motion of the hoist bar causes each dog to control each successive basket as the baskets are conveyed through the machine.

In the present example, the apparatus disclosed is designed specifically for the treatment of metal parts preliminary to applying a vitreous enamel coating. For this purpose, the series of tanks or stations generally indicated at 31, beginning at the loading end of the machine, are arranged in the following manner.

The first tank 150 contains a caustic solution, the second 151, an alkaline wash, followed successively by two hot rinse tanks 152 and 153, a pickling tank 154, and a second pickling tank 155, which is in the form of a return bend at the forward end of the machine. Following this is a pair of rinse tanks 156—156, a nickel dip tank 157, a rinse tank 158, a neutralizing tank 159 followed by a neutralizing tank 160. From neutralizing tank 160 the parts pass through a drying chamber 161 in which is circulated a stream of warm air to carry away moisture adhering to the parts.

It will be noted that the several tanks described are of different lengths, for example, tanks 150 and 151 are sufficiently long to contain five work baskets each, while tanks 152 and 153 contain one basket, and tank 154 contains two baskets. This permits simultaneously to vary the treatment periods at the several stations. In other words, a given work basket will remain in tanks 150 and 151 for a time period five times greater than the treatment period the basket receives in the short tanks 152 and 153.

This timing differential is provided in the following manner. The cycle of operation as noted is based upon a fixed time interval, which time interval includes the raising, horizontal transfer, lowering movements of the baskets, and the final cycle or treatment period. During the treatment period, the parts are submerged or suspended in the tanks for treatment therein.

In the instance of tanks 150 and 151, the hoisting dog is omitted from the hoist bars except for one dog which engages the basket at its loading zone indicated at 162, elevates it, and lowers it into the first position in tank 150.

After lowering the basket, the dog is tripped by a cam 92 provided for this purpose, and the dog is free to return to the loading zone to pick up the next basket. In feeding the baskets into the machine, the work pieces may be packed into the baskets and the baskets transported either by a conveyor or upon suitable trucks or dollies to the loading station. During the treatment period the conveyor is stationary and the U-shaped brackets 60 are in their lowered positions. Therefore, the cross shaft 67 of the basket may readily be engaged in the hooks 65 to elevate the basket and carry it into the machine when the next cycle begins. In the same manner, the baskets are lowered at the unloading zone to be conveniently unhooked and transported to other parts of the plant.

The balance of the hoist bar disposed above tank 150 is devoid of hoist dogs, therefore, although the bar is translated at the end of each cycle to hoist the baskets therein, this motion is not effective to raise the baskets from this particular tank. Therefore, the baskets remain continuously suspended in the solution, and travel intermittently therethrough as the conveyor advances intermittently. Upon reaching the end of the tank, each basket is serially engaged by a dog operating between tanks 150 and 151 to raise the basket above the tank, permitting the conveyor to translate it to a position above the leading end of tank 151, and upon lowering motion of the hoist bar, the basket is lowered into the tank 151 and continues therethrough in the same manner as in tank 150.

Upon reaching the end of tank 151 the basket is again elevated by a dog operating between tanks 151 and 152. In this instance, the basket remains in tank 152 for one cycle or one time interval only. It is then picked up and transferred to tank 153.

It will be apparent, therefore, that the apparatus functions in cycles or multiples of cycles as determined by the individual length of the several treating tanks. Therefore, by providing tanks sufficiently long to contain a number of baskets corresponding to the number of cycles required in a given treatment, the parts may be given treatments then according to the requirement for each individual station or treatment tank. The treatment periods may range from one cycle in which is used a tank dimensioned to receive a single basket, up to any desired multiple of cycles, providing tank sufficient in length to receive the required number of baskets, is provided.

The apparatus, therefore, is quite flexible as to its industrial application since the same apparatus may be converted without difficulty to the desired process. While the basic apparatus remains the same, the duration of treatments is readily adapted to its required use simply by removing dogs at appropriate stations and in appropriate numbers, to provide the required time intervals. Tanks or chambers may then be constructed to receive the required number of baskets corresponding to the single or multiple cycle requirements.

Having described my invention, I claim:

1. A processing apparatus comprising a horizontally movable conveyor, a plurality of chemical treatment tanks disposed beneath the conveyor, a series of work baskets suspended individually from said conveyor and adapted to be lowered vertically to said treatment tanks, horizontally movable hoist means adapted to raise or lower said baskets vertically relative to the tanks, individual power means for operating said hoist means and said conveyor intermittently in timed relationship and means causing the work baskets to remain for differential treatment periods in the respective treatment tanks.

2. A machine for subjecting parts to successive treatments at successive treatment stations, said machine comprising horizontally movable members, one constituting a conveyor and the other constituting a hoisting device, individual power means for said hoisting device and said conveyor means for moving said members intermittently in unison and differentially with respect to one another, a series of work baskets having flexible suspension means, said flexible suspension means being interconnected to said hoisting member and respectively traversing hangers on said conveyor member whereby differential horizontal movement of the hoisting member with respect to the conveyor member is effective for raising and lowering said baskets vertically toward or from said treatment stations, while horizontal movement of said members in unison is effective for advancing said work baskets horizontally from station to station.

3. A machine for subjecting parts to successive treatments at successive treatment stations, said machine comprising horizontally movable members, one constituting a conveyor and the other constituting a hoisting device, individual power units respectively for each of said members, a control system for causing said members to move intermittently in unison and differentially with respect to one another, a series of hangers connected to said conveyor member, a series of work baskets having suspension means, said suspension means being interconnected with said hoisting member and traversing the hangers on said conveyor member whereby differential movement of the hoisting member with respect to the conveyor member is effective for raising and lowering said baskets vertically toward or from said treatment stations, while movement of said members in unison is effective for advancing said work baskets from station to station.

4. A machine for subjecting parts to successive treatments at successive treatment stations, said machine comprising horizontally movable members, one constituting a conveyor and the other constituting a hoisting device, means for moving said members intermittently in unison and differentially with respect to one another, a series of hangers connected to said conveyor member, a series of work baskets having flexible suspension means, means on said hoisting member for interconnecting said suspension means to said hoisting member and traversing the hangers on said conveyor member, whereby differential movement of the hoisting member with respect to the conveyor member is effective for raising and lowering said baskets vertically toward or from said treatment stations, while movement of said members in unison is effective for advancing said work baskets from station to station, said interconnecting means on said hoisting member being constructed and arranged to disengage said suspension means after a differential movement of the hoisting member effective to lower the baskets to permit the interconnecting means to interconnect the hoisting member with a succeeding series of work baskets.

5. A processing apparatus comprising an endless horizontally movable conveyor, a plurality of treatment stations disposed beneath said conveyor, said conveyor arranged to advance intermittently from station to station, a series of work baskets suspended individually from the conveyor, a horizontally movable hoist mechanism extending parallel with the conveyor, individual power means for operating said hoist means and said conveyor intermittently in timed relationship, said hoist mechanism having coupling devices adapted to raise said baskets vertically relative to the stations when the conveyor is stationary by horizontal movement of the hoist mechanism relative to the stationary conveyor and maintain said baskets in raised position during the intermittent horizontal advance of the conveyor by horizontal movement of the hoist mechanism in unison with the advancement of the conveyor, the coupling devices being adapted to lower the same vertically into successive stations at the end of the intermittent conveyor advance by horizontal movement of the hoist mechanism relative to the stationary conveyor, said hoist movement being in a direction opposite to the movement for raising the basket, and control means connected to both of said individual power means operable to control the movements of the conveyor and hoist mechanism with respect to one another.

6. A treating apparatus for the continuous treatment of parts comprising: a horizontal conveyor, a series of treatment stations horizontally disposed beneath said conveyor, a series of work carrying receptacles carried by said conveyor, said conveyor arranged to advance the receptacles intermittently in a horizontal direction relative to said stations, means for causing the receptacles to be raised or lowered vertically relative to the stations comprising a horizontally reciprocating hoisting mechanism arranged to cooperate with the conveyor to raise or lower said receptacles vertically by horizontal movement of the hoisting mechanism when the conveyor is stationary, and individual power units for said conveyor and hoisting mechanism operable to control the movements of the conveyor and hoisting mechanism with respect to each other.

7. In a processing machine having a series of work carrying receptacles, an endless horizontally movable conveyor, a plurality of treatment chambers and a horizontally movable hoist bar associated with said conveyor, means for transferring the receptacles from chamber to chamber comprising; a control system and power means for advancing the hoist bar and conveyor unitarily to transfer the receptacles horizontally to a position above a series of chambers, said control system operable to stop the conveyor and translate the hoist bar a sufficient distance to lower the receptacles vertically into the chambers, and to control the period of treatment in said chambers the control system being operable to actuate the hoist bar to a position for engagement with a succeeding series of receptacles during the treatment period.

8. A treating apparatus for the continuous surface treatment of parts comprising; an endless conveyor system, a series of treatment stations disposed beneath said conveyor system, a series of carriages connected to the conveyor, a series of work carrying baskets, one for each of said carriages, said baskets being connected to said carriages, means for causing the baskets to be raised or lowered vertically relative to the carriages comprising a horizontally movable hoisting mechanism arranged to cooperate with said carriages to raise or lower said baskets relative to the conveyor, an individual power unit respectively for said conveyor and for said hoisting mechanism, and control means associated with said respective power units, said control means operable to control the movements of the conveyor and hoisting mechanism with respect to each other whereby the differential movements of the hoisting member and conveyor member are effective for raising and lowering said baskets vertically to or from said treatment stations.

9. A processing machine for serially treating a plurality of work pieces sustained in grouped relationship in a series of work carrying baskets comprising; a horizontally movable endless conveyor, a plurality of treatment chambers disposed beneath said conveyor and in alignment therewith, said chambers having length dimensions corresponding to one or a multiple of treatment periods, a power unit connected to the conveyor and adapted to advance the conveyor intermittently in a series of steps corresponding to a single treatment period and corresponding to the length dimension of the shortest of said treatment chambers, horizontally movable elevating means coextensive with said conveyor, a second power unit connected to the elevating means and adapted to advance and retract said elevating means, said elevating means having coupling devices adapted selectively to elevate the baskets vertically with respect to said chambers by horizontal movement relative to the conveyor when a basket has reached the end of a chamber to cause the basket to be conveyed to a succeeding chamber and lowered therein the basket being conveyed by advancement of the elevating means in unison with the advancement of the conveyor and being lowered by advancement of the elevating means relative to the conveyor, and control means connected to said power units and adapted to correlate the movements of the conveyor and elevating means with respect to one another.

10. A processing machine for serially treating a plurality of work pieces sustained in group relationship in a series of work carrying baskets comprising; a continuous loop-shaped conveyor, a plurality of treatment chambers disposed beneath said conveyor and in alignment therewith, a plurality of carriages connected to said conveyor, one for each of said work carrying baskets, flexible suspension means connecting the baskets to the carriages, movable in a horizontal path said conveyor arranged to advance intermittently in a series of timed treatment cycles corresponding to the length dimension of the shortest of said treatment chambers, elevating means parallel with said conveyor, said elevating means having coupling devices engageable with said flexible suspension means and arranged to elevate the baskets with respect to said treatment chambers by differential movement with respect to the conveyor and to transfer the baskets collectively from chamber to chamber by movement in unison with the conveyor, said means operable to cause the baskets to remain submerged in those tanks requiring a treatment period consisting of more than one cycle and capable of elevating those baskets required to be transferred to a next succeeding tank.

11. A processing machine for serially treating a plurality of work pieces sustained in grouped relationship in a series of work carrying baskets comprising; a continuous loop-shaped conveyor, a plurality of treatment chambers disposed beneath said conveyor, said chambers being of non-uniform length to provide various time periods of treatment therein, a plurality of carriages connected to said conveyor, one for each of said work supporting baskets flexible suspension members connecting the baskets to the carriages, said conveyor arranged to advance intermittently in steps corresponding to the length dimension of the shortest of said treatment chambers, each of said steps constituting one treatment period, horizontally translatable elevating means parallel with said conveyor, said elevating means having coupling devices engageable with said flexible suspension members and arranged to elevate the baskets with respect to said chambers by differential movement with respect to the conveyor and to transfer the baskets collectively from chamber to chamber by movement in unison with the conveyor, the hoisting means being constructed and arranged selectively to cause the baskets to remain disposed in those chambers having a length dimension greater than one treatment period and capable of elevating those baskets required to be transferred to a next succeeding chamber.

12. A processing machine for serially treating a plurality of work pieces sustained in group relationship in a series of work carrying baskets comprising; an endless conveyor, a plurality of treatment chambers disposed beneath said conveyor, said chambers having individual length dimensions corresponding to a timed treatment period required in each chamber individually, said conveyor arranged to advance intermittently in a series of steps corresponding to the length dimension of the shortest of said treatment chambers for a single treatment period therein, horizontally movable elevating means parallel with said conveyor, said elevating means arranged to elevate the baskets vertically with respect to said short chambers by differential horizontal movement relative to the conveyor and to transfer the baskets collectively from chamber to chamber during each advance of the conveyor by horizontal movement in unison with the conveyor, the elevating means being constructed and arranged selectively to permit the baskets to remain in those chambers having a length dimension of greater than to one treatment period to cause the baskets to be translated through said chambers during several intermittent advancement steps of the conveyor.

13. An apparatus for continuously treating a series of parts comprising; an endless conveyor of loop formation providing a forward and return conveyor run, a series of treatment stations disposed beneath the conveyor runs, a pair of forward and return hoist bars extending respectively along the forward and return conveyor runs, a series of work receptacles carried by the conveyor, said conveyor arranged to advance the work receptacles intermittently from station to station and to stop with the receptacles poised above the stations, means on the conveyor cooperating with the hoist bars causing the baskets to be raised or lowered relative to the stations by actuation of the hoist bars, said hoist bars being arranged to reciprocate in timed relationship with the intermittent advance of the conveyor to lower said receptacle after said conveyor has stopped and to elevate the receptacles prior to the next advance of the conveyor.

14. A processing apparatus comprising a conveyor of loop formation providing forward and return runs, a plurality of treatment stations disposed beneath said conveyor, said conveyor arranged to advance intermittently in cycles from station to station, a series of work baskets suspended individually from the conveyor, a hoist bar coextensive respectively with said forward and return conveyor runs, said hoist bars including dog elements, one for each of said treatment stations, said elements adapted to raise said baskets relative to the stations when the conveyor is stationary and maintain said baskets in raised position during the intermittent advance of the conveyor and to lower the same into successive stations at the end of the intermittent conveyor advance, a series of trip cams, said cams arranged to trip said dog elements to release the dogs when said baskets are in lowered position to permit the hoist bars to retract and engage a succeeding series of baskets at the end of each cycle.

15. A processing apparatus comprising an endless conveyor, a series of treatment stations disposed beneath the conveyor, a work receptacle carried by the conveyor, said conveyor arranged to advance the receptacle intermittently relative to said stations, hoisting means carried by the conveyor for said receptacle, a reciprocating hoist bar, a series of latch dogs carried by said hoist bar and engageable with said hoisting means carried by the conveyor to vertically raise or lower said receptacle relative to the treatment stations when said hoist bar is reciprocated horizontally, a series of trip cams, one for each of said treatment stations, said cams arranged to disengage the latch dog from said hoisting means at the end of a lowering movement of the hoist bar to permit the receptacle to advance to a successive treatment station, said latch dogs and said trip cams constructed and arranged to permit each latch dog to be tripped by an alternate trip cam to permit each latch dog to overrun one trip cam and trip at a succeeding cam at the end of the lowering stroke of the hoist bar.

16. An apparatus for continuously treating a series of parts comprising; an endless conveyor, a series of work treating stations disposed beneath said conveyor, a series of carriages connected to said conveyor, a plurality of work receptacles, flexible members connecting the receptacles to the carriages, a series of fixtures, each of said fixtures arranged to removably engage and sustain a work receptacle, hoisting means arranged to engage the flexible members and by horizontal movement relative to the conveyor to cause said fixtures and receptacles to be raised and lowered relative to said treating stations, a pair of guide rods on each of said fixtures to guide the fixtures and receptacles vertically relative to the treating stations.

17. A processing machine for transferring from station to station a plurality of work pieces for timed treatment periods at each respective station, comprising; an endless horizontally movable conveyor, a series of treating stations disposed beneath said conveyor, a plurality of work receptacles, a series of conveyor carriages, each of said carriages having a fixture arranged to removably engage and sustain a work receptacle one for each of said carriages, each of said carriages having flexible suspension means associated therewith and connected to said fixture for raising and lowering the fixtures and work receptacles relative to said treating stations, said conveyor being arranged to advance intermittently from station to station, horizontally movable hoisting bars coextensive with the conveyor having elements arranged to engage said flexible suspension means and by horizontal movement of the hoisting bar with respect to the conveyor, to raise and lower the receptacles vertically, vertically disposed guide rods carried by each of said fixtures, and guide means engaging said rods carried by each of said carriages, said means arranged to stabilize the fixtures and receptacles carried thereby to guide the same vertically into and out of said stations when the conveyor is stationary.

18. An apparatus for continuously treating a series of parts comprising; an endless conveyor of loop formation providing forward and return conveyor run, a pair of forward and return hoist bars extending along the respective forward and return conveyor runs, a series of carriages connected to said conveyor, a series of work carrying baskets, one for each of said carriages, a pulley tackle carried by each of said carriages, said tackle having a cable, a primary and a secondary pulley, the primary pulley being journalled in said carriage and the secondary pulley being longitudinally translatable relative to the carriage, said cable having one of its ends connected to the carriage, passing over said secondary translatable pulley and over the primary pulley and having its opposite end depending vertically and connected to one of said work carrying baskets, each of said hoist bars including latching means engageable with said secondary pulley to translate the pulley horizontally to raise and lower the basket vertically relative to the conveyor, and individual power units in driving connection respectively with said conveyor and with said hoisting bars, and means for controlling said power units to cause the conveyor to advance the baskets from station to station intermittently and to cause operation of said hoist bars to raise or lower the baskets when said conveyor is stationary.

19. An apparatus for continuously treating a series of parts comprising; an endless horizontal conveyor of loop formation providing a forward and return conveyor run, a pair of forward and return hoist bars extending horizontally along the respective forward and return conveyor runs, a series of carriages connected to said conveyor, a series of work carrying baskets one for each of said carriages, a horizontally translatable pulley and a fixed pulley carried by each of said carriages, a cable for each of said carriages, the cable having one of its ends connected to the carriages, passing over said translatable pulley and over the fixed pulley and having its opposite end depending vertically and connected to said work carrying baskets, each of said hoist bars including latching means engageable with said pulleys to translate the pulleys horizontally to raise the baskets vertically relative to the conveyor said pulley causing an increase in vertical basket motion relative to horizontal hoist bar motion.

20. A machine for transferring from station to station a plurality of work carrying baskets for timed treatment periods at each respective station comprising an endless loop-shaped conveyor providing a pair of longitudinal forward and return runs, respective forward and return hoist bars associated with said forward and return runs, a series of carriages, one for each of said work baskets, said carriages having means associated therewith for raising the baskets relative to said carriages, a power unit for said hoist bars located at one end of the forward hoist bar, power transfer means at the opposite end of said hoist bar, said transfer means connected to the forward end of said return run hoist bar to cause longitudinal movement of the forward run hoist bar to be transmitted to the return run hoist bar to cause said bars to move respectively in opposite directions, latching means carried by said bars, said latching means operable to engage said basket elevating means on said carriages to raise or lower the baskets upon actuation of the hoist bars, and means for disengaging said latching means when the conveyor is actuated to transfer the baskets to a succeeding station.

21. A machine for transferring from station to station a plurality of work carrying baskets for timed treatment periods at each respective station comprising; an endless loop-shaped conveyor providing a pair of longitudinal forward and return runs, a series of treating stations disposed beneath said conveyor runs, respective hoist bars associated with the forward and return conveyor runs, a series of conveyor carriages, a series of work baskets, one for each of said carriages, said carriages having means associated therewith for raising and lowering the baskets relative to said treating stations, a power unit for said hoist bars located at one end thereof, power transfer means at the opposite end of said hoist bar, said transfer means connected to the forward end of said return run hoist bar to cause longitudinal movement of the forward run conveyor bar to be transmitted to the return run hoist bar to cause said bars to move respectively in opposite directions, and latching means carried by said bars, said latching means operable to engage said basket elevating means on said carriages to raise or lower the baskets upon actuation of the hoist bars, and means for disengaging said latching means when the conveyor is actuated to transfer the baskets to a succeeding station.

22. A processing machine for serially treating a plurality of work pieces sustained in group relationship in a series of work carrying receptacles comprising; an endless conveyor, a plurality of treatment chambers disposed beneath said conveyor and in alignment therewith, a hoist bar associated with said conveyor, a series of latch dogs carried by said hoist bar, one for each of said chambers, and individual hoisting elements carried by the conveyor, one for each of said receptacles, said hoisting elements engageable by said latch dogs to elevate the receptacle collectively by a longitudinal movement of the hoist bar while the conveyor is stationary, control means for advancing the hoist bar and conveyor unitarily to transfer the receptacles to a position above a succeeding series of chambers, said control means operable to stop the conveyor and translate the hoist bar a sufficient distance to lower the receptacles into the chambers, and means for disengaging said latch dogs at the end of said lowering movement to permit the hoist bars and dogs to be reciprocated to a position for engagement of hoist dogs with a succeeding series of receptacles during the time the conveyor is stationary.

23. A processing apparatus comprising an endless conveyor, a series of treatment stations disposed beneath the conveyor, a series of work receptacles carried by the conveyor, said conveyor arranged to advance the receptacles intermittently relative to said stations, individual hoisting means carried by the conveyor, one for each of said receptacles, a reciprocating hoist bar, a series of latch dogs carried by said hoist bar and engageable with said hoisting means carried by the conveyor to vertically raise or lower said receptacles relative to the treatment stations when said hoist bar is reciprocated horizontally, a series of trip cams, one for each of said treatment stations, said cams arranged to trip and disengage the latch dogs from said hoisting means at the end of a lowering movement of the hoist bar to permit the hoist bar to retract to engage a succeeding series of hoisting means to elevate a succeeding series of receptacles, said latch dogs and said trip cams constructed and arranged to permit each latch dog to be tripped by an alternate trip cam to permit each latch dog to overrun one trip cam and trip at a succeeding cam at the end of a basket lowering stroke.

24. A processing apparatus comprising a conveyor of loop formation providing forward and return runs, a plurality of treatment stations disposed beneath said conveyor, a series of work baskets suspended individually from the conveyor, said conveyor arranged to advance said work baskets intermittently in cycles from station to station, a hoist bar coextensive respectively with said forward and return conveyor runs, said hoist bars including a series of latch dogs, one for each of said treatment stations, and individual hoisting elements carried by the conveyor, one for each work basket, said hoisting elements adapted to be engaged by said latch dogs to raise said baskets relative to the stations when the conveyor is stationary and to maintain said baskets in raised position during the intermittent advance of the conveyor and to lower the same into successive stations at the end of the intermittent conveyor advance, a series of trip cams, said cams arranged to trip said dog elements to release the dogs when said baskets are in lowered position to permit the hoist bars to retract and engage a succeeding series of baskets at the end of each cycle, said trip cams and latch dogs keyed with respect to each other to permit each latch dog to overrun one trip cam and trip at a succeeding cam at the end of a lowering stroke.

25. A processing machine for serially treating a plurality of work pieces sustained in group relationship in a series of work carrying receptacles comprising; an endless conveyor, a plurality of treatment chambers disposed beneath said conveyor and in alignment therewith, a hoist bar associated with said conveyor, a series of latch dogs carried by said hoist bar, one for each of said chambers, and individual hoisting elements carried by the conveyor, one for each of said receptacles, said hoisting elements engageable by said latch dogs to elevate the receptacles collectively by a longitudinal movement of the hoist bar while the conveyor is stationary, control means for advancing the hoist bar and conveyor unitarily to transfer the receptacles to a position above a succeeding series of chambers, said control means operable to stop the conveyor and translate the hoist bar a sufficient distance to lower the receptacles into the chambers, and a series of trip cams, one for each of said chambers, for disengaging said latch dogs at the end of said lowering movement to permit the hoist bars and dogs to be returned to a position for engagement of the hoist dogs with a succeeding series of receptacles during the time the conveyor is stationary, said latch dogs and trip cams being constructed and arranged to permit each latch dog to overrun one chamber and trip cam without tripping so as to permit the hoist bar to move a sufficient distance greater than the distance between chambers to lower the baskets and to be tripped at a succeeding trip cam.

26. A processing apparatus comprising a horizontally movable endless conveyor, a plurality of treatment stations disposed beneath the conveyor, a series of work receptacles suspended individually from said conveyor and adapted to be lowered to said stations, horizontally translatable hoisting means adapted to raise or lower said baskets vertically relative to the stations, individual power units respectively for said conveyor and hoisting means, control means interconnecting said individual power units adapting the conveyor and hoisting means in unison to advance to a succeeding treatment station when the work receptacles are elevated above the treatment stations and causing the hoisting means to be translated with respect to the conveyor to cause the receptacles to be lowered into succeeding treatment stations, said control means being adapted to provide a timed cycle to determine a single treatment period during which the receptacles are lowered, and mechanical means adapted to cause the parts to remain lowered for a plurality of cycles for differential treatment periods at the several stations.

27. In a processing machine having a series of work carrying receptacles, a conveyor, a plurality of treatment chambers and a hoist bar associated with said conveyor, an individual electric power unit for said conveyor and hoist bar, means for transferring the receptacles from chamber to chamber comprising; a control system for controlling said power units for advancing the hoist bar and conveyor unitarily to position the receptacles above successive chambers, said control system operable to stop the conveyor and translate the hoist bar relative thereto to lower the receptacles into the chambers, said control system including a switch actuating bar secured to the hoist bar for movement therewith, a plurality of control switches, means on said switch actuating bar and said conveyor to control said switches, said switches being electrically interconnected with one another and with the power units in a manner to coordinate the movements of the conveyor and hoist bar to cause the conveyor and hoist bar to be translated in unison in one direction to advance the receptacles from chamber to chamber and to translate the hoist bar with respect to the conveyor after such advancement in a direction to lower the receptacle to the chamber, the said control system being constructed and arranged to control the period of treatment in said chambers and to cause the hoist bar to be reciprocated to a position for engagement with a succeeding series of receptacles during the treatment period.

28. A processing machine for transferring from station to station a plurality of work pieces for timed treatment periods at each respective station, comprising; an endless conveyor, a series of treating stations disposed beneath said conveyor, a plurality of work receptacles, a series of conveyor carriages, each of said carriages having a fixture arranged to removably engage and sustain a work receptacle one for each of said carriages, each of said carriages having flexible suspension means associated therewith and connected to said fixture for raising and lowering the fixtures and work receptacles relative to said treating stations, said conveyor arranged to advance intermittently from station to station, vertically disposed guide rods carried by each of said fixtures, guide means engaging said rods carried by each of said carriages, stops associated with said guide rods and engageable with said guide means to support said receptacle and relieve said flexible suspension means when the receptacle is in lowered position, and counterweight means arranged to maintain said flexible suspension means in taut condition when the receptacle is suspended by said guide rods.

29. A processing machine for transferring from station to station a plurality of work pieces for timed treatment periods at each respective station, comprising; an endless conveyor, a series of treating stations disposed beneath said conveyor, a plurality of work receptacles, a series of conveyor carriages, each of said carriages having a yoke arranged to removably engage and sustain a work receptacle, one for each of said carriages, each of said carriages having means associated therewith for raising and lowering the yokes and work receptacles relative to said treating stations, each of said means including a cable, a counterweight carried at the lower end of said cable, guide rails on said yoke engaging said counterweight and permitting the same to move vertically relative to said yoke, vertically disposed guide rods carried by each of said yokes, guide means engaging said rods carried by each of said carriages, and stops secured to the upper ends of said rods to engage said guide means and sustain the receptacle in lowered position, said counterweight arranged to maintain the cable in taut condition when the receptacle is supported by said guide rods and to engage said guide rails and raise said yoke and receptacle when the cable is retracted to raise the receptacle.

30. A processing apparatus comprising, a horizontally movable conveyor, a plurality of treatment stations disposed beneath the conveyor, work baskets suspended from the conveyor and adapted to be moved vertically and advanced horizontally relative to said stations, a horizontally translatable hoist bar operatively associated with the conveyor and having means adapted to raise and lower said baskets vertically relative to the stations in response to translatory horizontal movements of the hoist bar, power means for translating the hoist bar and for advancing the conveyor, the said power means being arranged to coordinate the translatory movements of the hoist bar with the movements of the conveyor to move the work baskets vertically with respect to the treatment stations and to intermittently advance the work baskets in elevated position horizontally to succeeding treatment stations.

31. A processing apparatus comprising, a horizontally movable conveyor, a plurality of treatment stations disposed beneath the conveyor, a series of work baskets suspended from the conveyor and adapted to be moved vertically and advanced horizontally relative to said stations, a horizontally translatable hoisting member coextensive with the conveyor and having members constructed and arranged to raise and lower said baskets vertically relative to the stations upon translatory horizontal movements of the hoisting member, individual power means for reciprocating said hoisting bar and conveyor, and control means interconnecting the said individual power means, said control means being constructed and arranged to coordinate the translatory movements of the hoisting member with the movements of the conveyor and thereby to elevate the work baskets vertically with respect to the treatment stations and to intermittently advance the work baskets horizontally to succeeding treatment stations with the work baskets in elevated position.

32. A processing apparatus comprising, a horizontal endless conveyor loop providing forward and return runs, a series of carriages connected to the conveyor for horizontal movement therewith, a series of treating stations disposed beneath the conveyor, a series of work baskets suspended from said carriages, a pair of forward and return hoist bars coextensive with the respective conveyor runs, means interconnecting the hoist bars for translating the same in unison in opposite directions, horizontally movable hoisting means on the carriages for suspending the work baskets, coupling means on the hoist bar engageable with the hoisting means, and a control system for causing the conveyor and hoist bars to move intermittently in unison and differentially with respect to one another, whereby said differential movements are effective for moving the work baskets vertically relative to the treating stations while movement intermittently in unison is effective for advancing the baskets horizontally from station to station.

33. In a processing machine having a series of work receptacles, a conveyor, a plurality of treatment chambers, a translatable hoist bar, and respective electric motors for driving the conveyor and translating the hoist bar in opposite directions, a control system for causing the conveyor and hoist bar to move intermittently in unison and differentially with respect to one another thereby to advance the receptacles horizontally and to move them vertically with respect to the treatment chambers, said control system including a switch actuating bar connected to the hoist bar, a pair of limit switches electrically connected to the hoist bar motor arranged to translate the hoist bar in opposite directions, a third switch intermediate said pair arranged to deenergize the hoist bar motor, means on the switch actuating bar for operating said switches, a conveyor control switch arranged to deenergize the conveyor motor upon intermittent advancements of the conveyor, means on the conveyor for operating said switch, the control system being constructed and arranged to energize the hoist motor at a predetermined interval after the same is deenergized by said third switch and thereby to translate the hoist bar relative to the conveyor in a direction to elevate the receptacles, one of said pair of limit switches being interconnected in the control system in a manner to cause both the conveyor and hoist bar to move in unison upon actuation of said switch at the limit of hoist bar movement and thereby to advance the receptacles in elevated position relative to the treatment chambers.

34. In a processing machine having a series of work receptacles, an intermittent conveyor, a plurality of treatment chambers, a translatable hoist bar, respective electric motors for driving the conveyor and translating the hoist bar, a control system for causing the conveyor and hoist bar to move intermittently in unison and differentially with respect to one another thereby to advance the receptacles horizontally and to move them vertically relative to the chambers, a pair of limit switches operatively associated with the hoist bar and interconnected with the hoist bar motor to translate the hoist bar in opposite directions, a third switch associated with the hoist bar and arranged to stop the hoist bar in an intermediate position, the control system being constructed and arranged to energize the hoist bar motor when the bar is in said intermediate position to move the hoist bar in a direction to elevate the receptacles, one of the limit switches being interconnected with the control system to advance the conveyor in unison with the hoist bar in the other direction to advance the receptacles, and a switch operatively associated with the conveyor and connected to the conveyor motor to stop the conveyor whereby continued hoist bar movement lowers the receptacles.

NATHAN RANSOHOFF.

REFERENCES CITED

The following references are of record in the file of this patent:

UNITED STATES PATENTS

| Number | Name | Date |
|---|---|---|
| 618,396 | Cowles | Jan. 31, 1899 |
| 1,255,083 | Davoran | Jan. 29, 1918 |
| 2,106,706 | Gordon | Feb. 1, 1938 |
| 2,116,430 | Gordon | May 3, 1938 |